(12) United States Patent
Anderson et al.

(10) Patent No.: US 6,446,484 B1
(45) Date of Patent: Sep. 10, 2002

(54) METHOD TO VARY BEND RADIUS WHILE FORMING A STABILIZER BAR

(75) Inventors: Gerald D. Anderson, Oxford, MI (US); Michael W. Mattice, Cambridge (CA); John M. Khoury, Warren, MI (US); Thomas M. Drouillard, Wallaceburg (CA); Kermit G. Rowe, III, Pembroke, KY (US); David I. Fretwell, Whiston; Alistair B. Lovatt, Sheffield, both of (GB)

(73) Assignee: Meritor Suspension Systems Company (CA)

( * ) Notice: Subject to any disclaimer, the term of this patent is extended or adjusted under 35 U.S.C. 154(b) by 0 days.

(21) Appl. No.: 09/710,236

(22) Filed: Nov. 10, 2000

(51) Int. Cl.⁷ .......................... B21D 31/00; B21D 11/04
(52) U.S. Cl. ........................... 72/477; 72/458; 267/154
(58) Field of Search ..................... 72/458, 477, 156; 267/154

(56) References Cited

U.S. PATENT DOCUMENTS

| | | | | | |
|---|---|---|---|---|---|
| 715,000 | A | * | 12/1902 | Benson | 72/457 |
| 1,264,519 | A | * | 4/1918 | Hinson | 72/477 |
| 1,378,796 | A | * | 5/1921 | Jones | 72/458 |
| 3,172,452 | A | * | 3/1965 | Bryant | 72/458 |
| 3,299,681 | A | * | 1/1967 | Hautau | 72/156 |
| 3,487,676 | A | * | 1/1970 | Guilbert et al. | 72/477 |
| 4,138,141 | A | * | 2/1979 | Andersen | 267/273 |
| 4,231,555 | A | * | 11/1980 | Saito | 267/154 |
| 4,522,055 | A | * | 6/1985 | Berger | 72/477 |
| 4,854,150 | A | * | 8/1989 | Brown et al. | 72/477 |
| 5,491,996 | A | * | 2/1996 | Baarman et al. | 72/477 |

* cited by examiner

*Primary Examiner*—David Jones
(74) *Attorney, Agent, or Firm*—Carlson Gaskey & Olds

(57) ABSTRACT

A method of varying the bend radius while forming a stabilizer bar is achieved by varying the radius of the forming tool over which the stabilizer bar is bent. The bend radius of the stabilizer bar is varied by changing the position and/or shape of the forming tool in relation to the stabilizer bar. The stabilizer bar is formed by bending the bar over the forming tool to create a bend of desired radius. In the disclosed embodiments, the forming tool is bent chain, a conical tool, and an eccentric shape with several distinct radii.

11 Claims, 3 Drawing Sheets

METHOD TO VARY BEND RADIUS WHILE FORMING A STABILIZER BAR

BACKGROUND OF THE INVENTION

The present invention relates generally to a method for varying the bend radius while forming a stabilizer bar of a vehicle suspension system.

Vehicles are commonly equipped with suspension systems for absorbing road shock and other vibrations, while providing for a smooth and comfortable ride. A suspension component, such as a stabilizer bar, is often used to increase roll rigidity and to improve the steering stability of the vehicle.

When forming a stabilizer bar in a CNC (computer numeric control) controlled bending machine, the bar is positioned within the machine so that the stabilizer bar is proximate to the forming tool at the desired point of formation. The stabilizer bar is formed over the forming tool at this point, creating a bend in the stabilizer bar. Because the forming tool is of a fixed design, the radii of the bends formed on the stabilizer bar cannot be varied while using the same tool. Bends of different radii can be formed by using different forming tools, but this requires changing the forming tool manually during formation, which is both time consuming and impractical.

Hence, there is a need in the art for a method for varying the bend radius while forming a stabilizer bar, which allows for the formation of bends of different radii on the bar while using the same forming tool.

SUMMARY OF THE INVENTION

This invention relates to a method for varying the bend radius while forming a stabilizer bar by varying the radius of the forming tool over which the stabilizer bar is bent.

In a first embodiment of the invention, a bent chain is used to form the stabilizer bar. The chain is positioned by actuators on a CNC controlled bending machine which engage the links of the chain and shape the chain into the desired radius. The stabilizer bar is then formed by wrapping the bar over the positioned chain, forming the stabilizer bar at the desired radius.

In another embodiment, the forming tool is conical shaped. Because the top of the cone has a smaller diameter than the bottom of the cone, bends of different radii can be formed on the bar using the same forming tool. The cone shaped tool is positioned by extending or retracting the tool perpendicularly to the length of the bar.

In another embodiment, an eccentric cam shaped forming tool of varying radii is used to form the stabilizer bar. The eccentric can shaped tool is positioned to form the stabilizer bar by rotating the tool so that the desired radius of the eccentric tool contacts the stabilizer bar at the point of formation.

A worker in this art would recognize that other ways of varying a bend radius can be used. Accordingly, the present invention provides a method to vary bend radius while forming a stabilizer bar.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
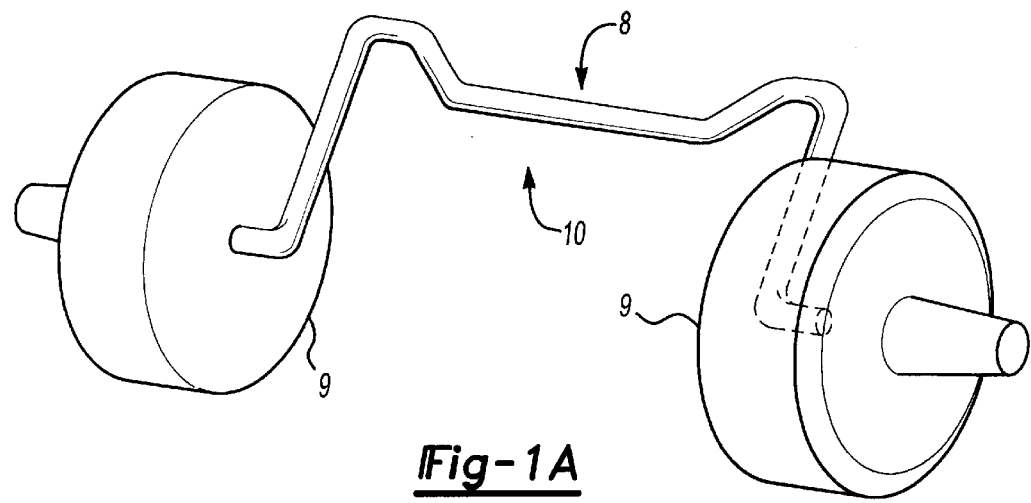
FIG. 1a illustrates a schematic view of a stabilizer bar mounted on a vehicle.

While the invention may be susceptible to embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1B:
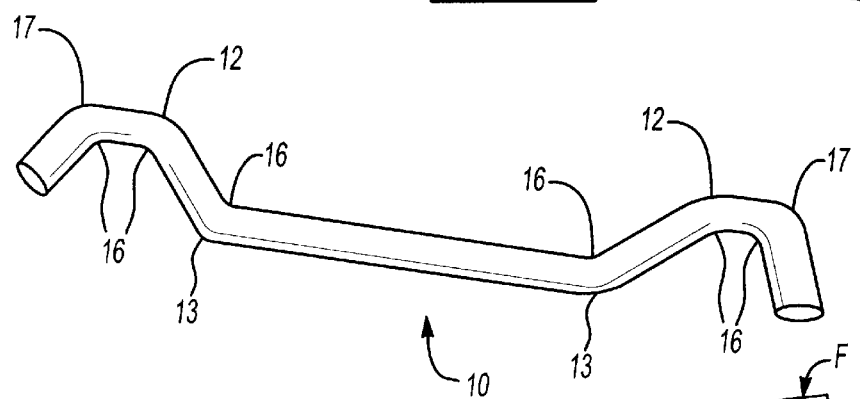
FIG. 1b illustrates a schematic view of a formed stabilizer bar.

FIG. 1a shows a bar 10 on a vehicle 8 mounted between wheels 9. As known, the bar 10 provides a stabilizer function. FIG. 1b illustrates a schematic view of a stabilizer bar 10 of a vehicle suspension system. Bends 12, 13, and 17 of different radii are created by forming the stabilizer bar 10 at points of formation 16 over a forming tool. The inventive forming tool has a plurality of radii so that bends 12, 13, and 17 of different radii can be formed on the stabilizer bar 10 without having to manually change the forming tool during formation. The radius of the bends 12, 13, and 17 formed on the stabilizer bar 10 can be varied by changing the positioning of the forming tool in relation to the stabilizer bar 10. In the preferred embodiment, the stabilizer bar 10 is cold formed. However, the stabilizer bar 10 can also be warm formed.

The stabilizer bar 10 is fed through a CNC (computer numeric control) controlled bending machine and rotated, positioning the stabilizer bar 10 so that the point of formation 16 (see FIGS. 2–5) is proximate to the forming tool. The forming tool is then positioned relative to the stabilizer bar 10 so the desired radius of the forming tool is proximate to the point of formation 16. The stabilizer bar 10 is then formed over the forming tool to create a bend 12, 13, and 17 of desired radius. Numerous bends 12, 13, and 17 can be formed on the stabilizer bar 10 by the successive positioning of the stabilizer bar 10 and forming tool. The tooling for moving the bar within the machine is known and forms no portion of the invention.

Figure 2A:
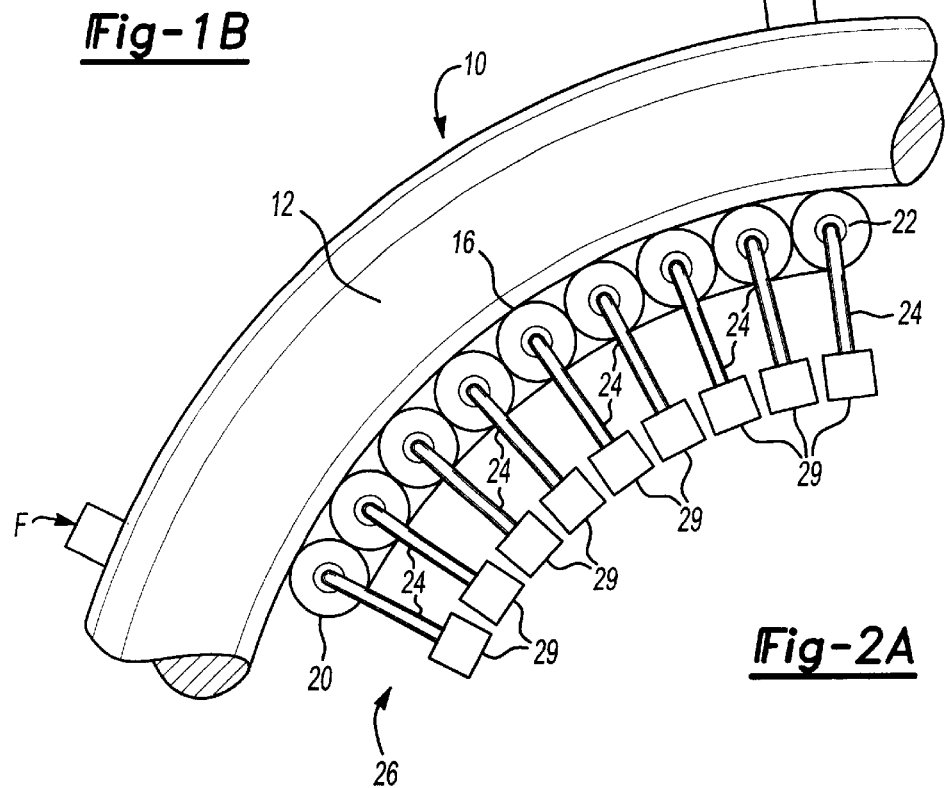
FIG. 2a is a sectional view of a bent chain used to form a stabilizer bar with a bend of a first radius.
Figure 2B:
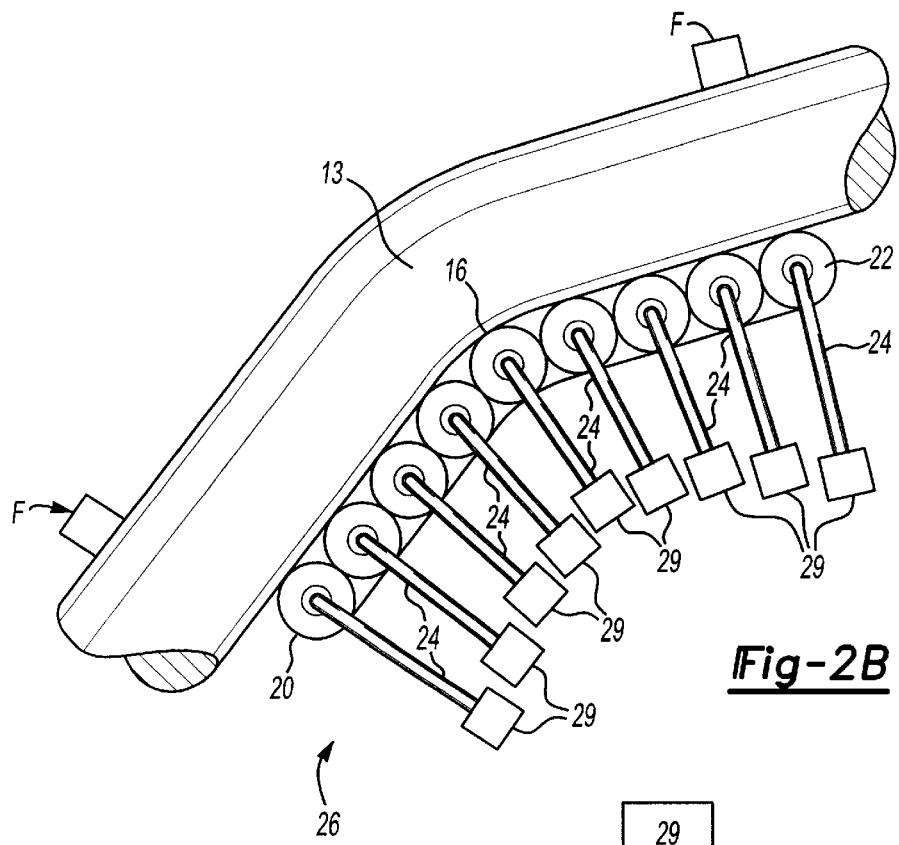
FIG. 2b is a sectional view of a bent chain used to form a stabilizer bar with a bend of a second radius.

FIGS. 2a and 2b illustrate a first embodiment of the present invention. As shown in FIGS. 2a and 2b, the forming tool is a chain 20. After the stabilizer bar 10 is positioned by the formation machine 26, the links 22 of the chain 20 are positioned at the point of formation 16 by actuators 24 on the formation machine 26. The actuators 24 bend the chain 20 to create the desired radius. The stabilizer bar 10 is formed over the bent chain 20 by wrapping the stabilizer bar 10 over the links 22 of the chain 20 as shown schematically by forces F. FIGS. 2a and 2b illustrate the formation of bends 12 and 13, respectively, of different radii on the stabilizer bar 10. A motor 29, shown schematically, is used to move the actuators 24. The motor 29 can be electric, fluid, actuated, or any other type of motor 29. In the preferred embodiment, the chain 20 is a heavy duty small pitch chain. The actuators 24 used to position the links 22 of the chain 20 can be servo electric screwjacks or servo hydraulic cylinders. While a chain 20 is illustrated, other endless members, such as belts, etc., may be used.

Figure 3:
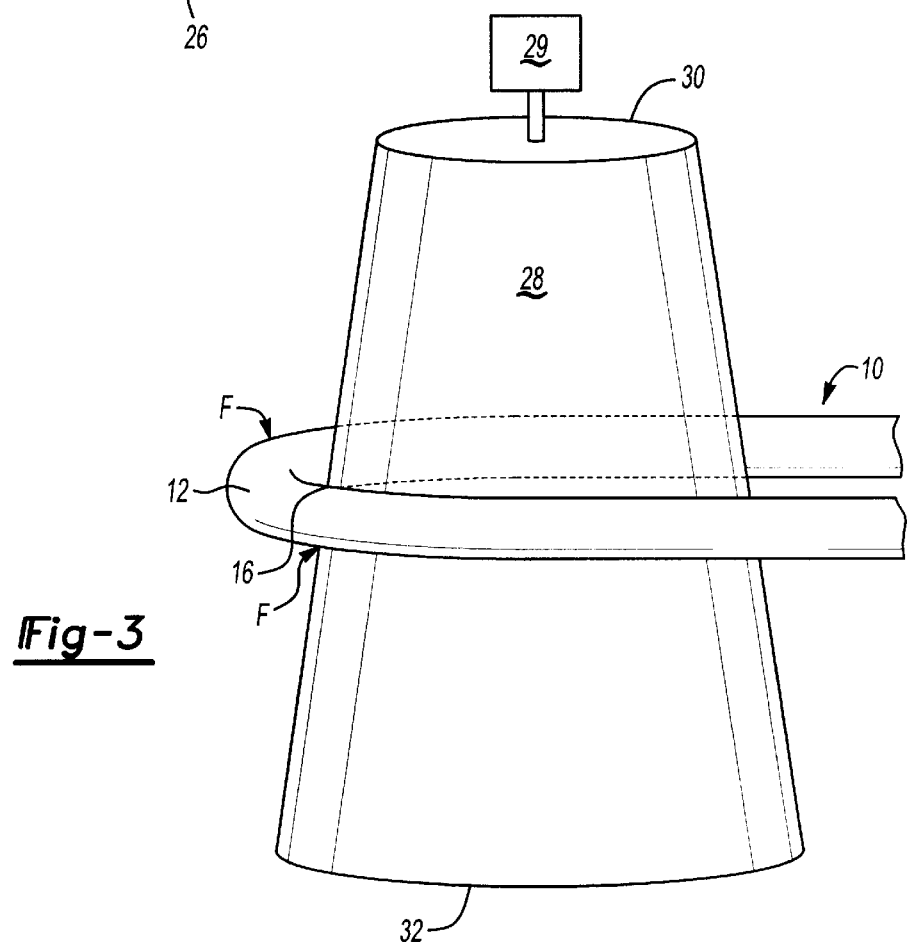
FIG. 3 is a schematic view of a cone shaped tool used to form a stabilizer bar.
Figure 4:
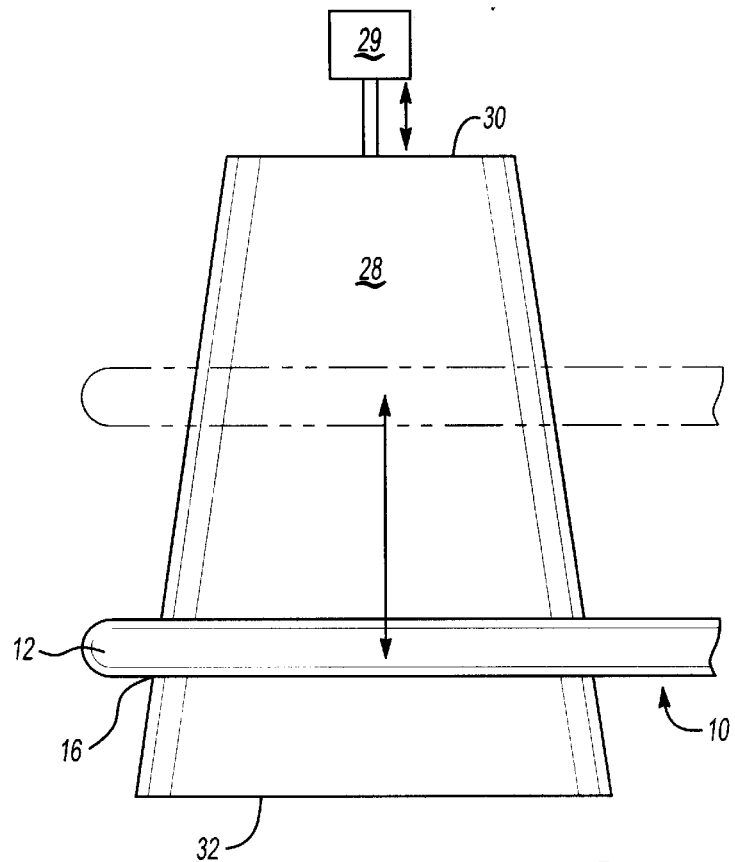
FIG. 4 is a side view of a cone shaped tool used to form a stabilizer bar showing the perpendicular movement of the tool in relation to the stabilizer bar.

FIG. 3 illustrates another embodiment of the present invention. A cone shaped forming tool 28 is used to form the stabilizer bar 10. Bends 12 of various radii can be formed on the bar 10 because the top 30 of the cone shaped forming tool 28 has a smaller diameter than the bottom 32 of the cone shaped forming tool 28. After the stabilizer bar 10 is positioned proximate to the forming tool 28 at a point of formation 16, the cone shaped forming tool 28 is positioned by perpendicularly translating the forming tool 28 in relation to the path of the stabilizer bar 10, as shown in FIG. 4. A motor 29, shown schematically, is used to move the tool 28. The motor 29 can be electric, fluid, or any other type of motor 29. Once the forming tool 28 is positioned, the stabilizer bar 10 is formed over the forming tool 28, again as shown schematically by forces F, creating a bend 12 of desired radius.

Figure 5:
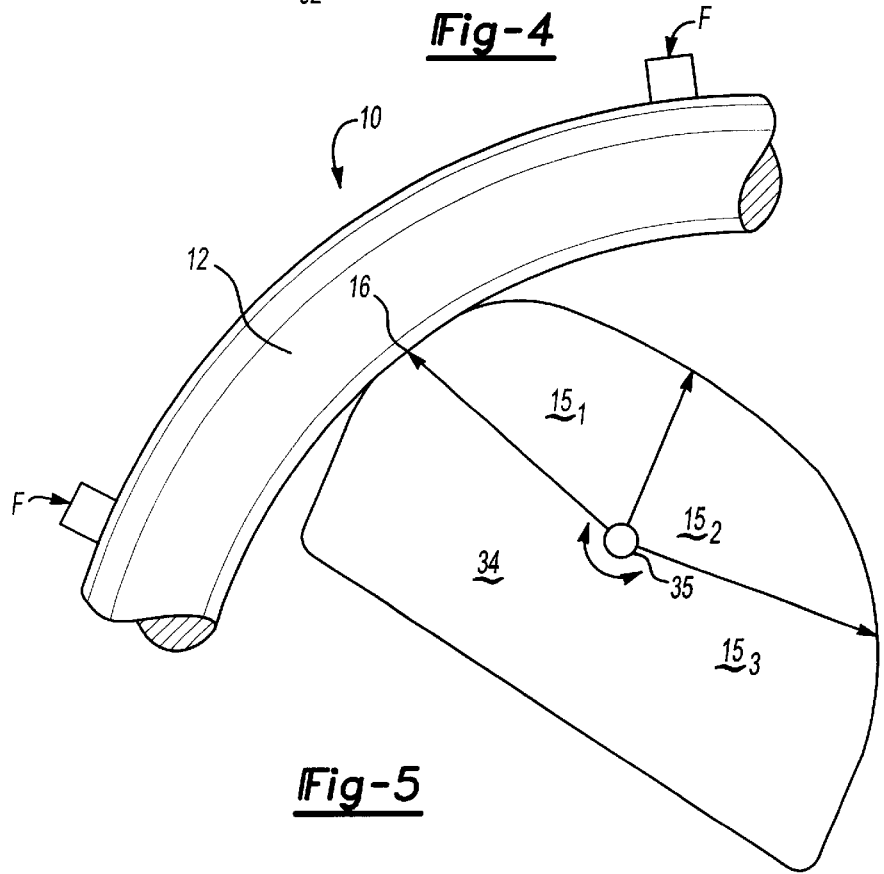
FIG. 5 is a top view of an eccentric cam shaped tool used to form a stabilizer bar.

FIG. 5 illustrates another embodiment of the present invention. An eccentric cam shaped forming tool 34 having a multiplicity of radii ($15_1$, $15_2$, $15_3$, etc.) is used to form the stabilizer bar 10 at the point of formation 16. After the stabilizer bar 10 is positioned, the eccentric forming tool 34 is rotated, positioning the forming tool 34 at the desired location with a desired radii $15_1$, $15_2$, $15_3$. A motor 35 serves to rotate the tool 34. The stabilizer bar 10 is then be formed over the eccentric forming tool 34 to create a bend 12 of desired radii on the stabilizer bar 10.

In each of the above embodiments the bars are received and held in a bending machine at a location adjacent to the above disclosed tools. The tools are moved to a desired shape and/or positioned and the bar is bent around the tool. The bending and the components for holding the bar may be as known in the art. It is the variation in the tool to alter distinct radii which is inventive here.

Accordingly, the present invention provides a method for varying the bend 12 radius while forming a stabilizer bar 10 without having to manually change the forming tool during formation. By varying the radius of the forming tool over which the stabilizer bar 10 is formed, bends 12 of different radii can be created on the stabilizer bar 10. Because the forming tool does not have to be manually changed during formation, the stabilizer bar 10 can be formed faster and more efficiently.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for varying a bend radius of a stabilizer bar of a vehicle suspension system comprising the steps of:

positioning said stabilizer bar proximate to a cone shaped farming tool having a substantially flat surface at a point of formation, said forming tool being positionable to provide a plurality of arcuate surfaces of varying radii;

positioning said forming tool such that an arcuate surface of a desired radius is positioned proximate to said point of formation; and forming said stabilizer bar at said point of formation over said arcuate surface of a desired radius to create a bend portion on said stabilizer bar.

2. The method as recited in claim 1 wherein said stabilizer bar and said forming tool are repositioned to create a second bend portion at a second point of formation on said stabilizer bar.

3. The method as recited in claim 2 wherein said forming tool is an endless member, and the step of positioning said forming tool comprises bending said endless member to create said arcuate surface of a desired radius.

4. The method as recited in claim 2 wherein the step of positioning said forming tool comprises translating said forming tool perpendicularly to said stabilizer bar.

5. An apparatus for varying the bend radius of a stabilizer bar of a vehicle suspension system comprising:

a bonding machine for positioning said stabilizer bar proximate to a forming tool at a point of formation; and a cone shaped forming tool having a substantially flat surface, said forming tool being positionable to provide a plurality of arcuate surfaces of varying radii, for forming said stabilizer bar at said point of formation over said arcuate surface of desired radius of said forming tool to create a bend portion.

6. The apparatus as recited in claim 5 wherein said forming tool is an endless member bent to create said arcuate surface of desired radius.

7. The apparatus as recited in claim 6 wherein said endless member is positioned by a plurality of actuators located on said bending machine.

8. A method for varying a bend radius of a stabilizer bar of a vehicle suspension system comprising the steps of:

positioning said stabilizer bar proximate to an eccentric shaped forming tool at a point of formation, said forming tool being positionable to provide a plurality of arcuate surfaces of varying radii;

positioning said forming tool such that an arcuate surface of a desired radius is positioned proximate to said point of formation; and forming said stabilizer bar at said point of formation over said arcuate surface of a desired radius to create a bend portion on said stabilizer bar.

9. The method as recited in claim 8 wherein said stabilizer bar and said forming tool are repositioned to create a second bend portion at a second point of formation on said stabilizer bar.

10. The method as recited in claim 8 wherein the step of positioning said forming tool comprises rotation of said forming tool.

11. An apparatus for varying the bend radius of a stabilizer bar of a vehicle suspension system comprising:

a bending machine for positioning said stabilizer bar proximate to a forming tool at a point of formation; and an eccentric shaped forming tool, said forming tool being positionable to provide a plurality of arcuate surfaces of varying radii, for forming said stabilizer bar at said point of formation over said arcuate surface of desired radius of said forming tool to create a bend portion.

* * * * *

UNITED STATES PATENT AND TRADEMARK OFFICE
CERTIFICATE OF CORRECTION

PATENT NO.   : 6,446,484 B1                                Page 1 of 1
DATED        : September 10, 2002
INVENTOR(S)  : Anderson et al.

It is certified that error appears in the above-identified patent and that said Letters Patent is hereby corrected as shown below:

Column 4,
Line 21, "bonding" should be -- bending --.

Signed and Sealed this

Eleventh Day of February, 2003

JAMES E. ROGAN
*Director of the United States Patent and Trademark Office*